US010021173B2

(12) United States Patent
Sugaya

(10) Patent No.: US 10,021,173 B2
(45) Date of Patent: Jul. 10, 2018

(54) E-BOOK SHARE SERVER, THE METHOD AND THE PROGRAM

(71) Applicant: OPTiM Corporation, Saga-shi, Saga (JP)

(72) Inventor: Shunji Sugaya, Tokyo (JP)

(73) Assignee: OPTiM Corporation, Saga-Shi, Saga (JP)

( * ) Notice: Subject to any disclaimer, the term of this patent is extended or adjusted under 35 U.S.C. 154(b) by 287 days.

(21) Appl. No.: 14/880,634

(22) Filed: Oct. 12, 2015

(65) Prior Publication Data

US 2016/0142473 A1  May 19, 2016

(30) Foreign Application Priority Data

Nov. 15, 2014 (JP) ................................ 2014-232265

(51) Int. Cl.
| | | |
|---|---|---|
| *H04L 29/08* | (2006.01) | |
| *H04L 12/24* | (2006.01) | |
| *G06F 17/30* | (2006.01) | |
| *H04L 29/06* | (2006.01) | |

(52) U.S. Cl.
CPC ...... *H04L 67/1002* (2013.01); *G06F 17/3089* (2013.01); *H04L 41/28* (2013.01); *H04L 41/5029* (2013.01); *H04L 67/04* (2013.01); *H04L 67/1012* (2013.01); *H04L 67/1097* (2013.01); *H04L 67/42* (2013.01)

(58) Field of Classification Search
CPC ............... G06F 17/241; G06F 17/2735; G06F 17/3089; G06Q 20/0453; G06Q 30/02; G09B 5/12; H04N 21/42201; H04L 67/1002; H04L 67/1012; H04L 67/04; H04L 67/42; H04L 67/1097; H04L 41/28; H04L 41/5029
See application file for complete search history.

(56) References Cited

U.S. PATENT DOCUMENTS

| | | | | |
|---|---|---|---|---|
| 2005/0132281 | A1* | 6/2005 | Pan ....................... | G06F 17/241 715/230 |
| 2007/0208751 | A1* | 9/2007 | Cowan ................... | G06Q 30/02 |
| 2012/0023399 | A1* | 1/2012 | Hoshino ............. | G06F 17/2735 715/256 |
| 2014/0120516 | A1* | 5/2014 | Chiang .................... | G09B 5/12 434/362 |
| 2014/0223462 | A1* | 8/2014 | Aimone ........... | H04N 21/42201 725/10 |
| 2016/0210602 | A1* | 7/2016 | Siddique ............ | G06Q 20/0453 |

* cited by examiner

*Primary Examiner* — Le H Luu
(74) *Attorney, Agent, or Firm* — Simpson & Simpson, PLLC; S. Peter Konzel

(57) ABSTRACT

The present invention is to allow a user for the secondary use of the electronic book according to the use act previously permitted by the copyright holder of the electronic book.
The electronic book sharing server communicatively connected with an electronic book terminal determines the permitted operation of a user identifier to the additional information based on the permitted operation data previously determined for the user identifier upon receiving the additional information added to an predetermined electronic book content from the electronic book terminal 10, and stores a tag information associating the additional information with a page number of the electronic book content, the additional information being added to the page number to allow a user to view the electronic content from the electronic book terminal.

9 Claims, 7 Drawing Sheets

Fig. 3 <ELECTRONIC BOOK SHARING PROCESS>
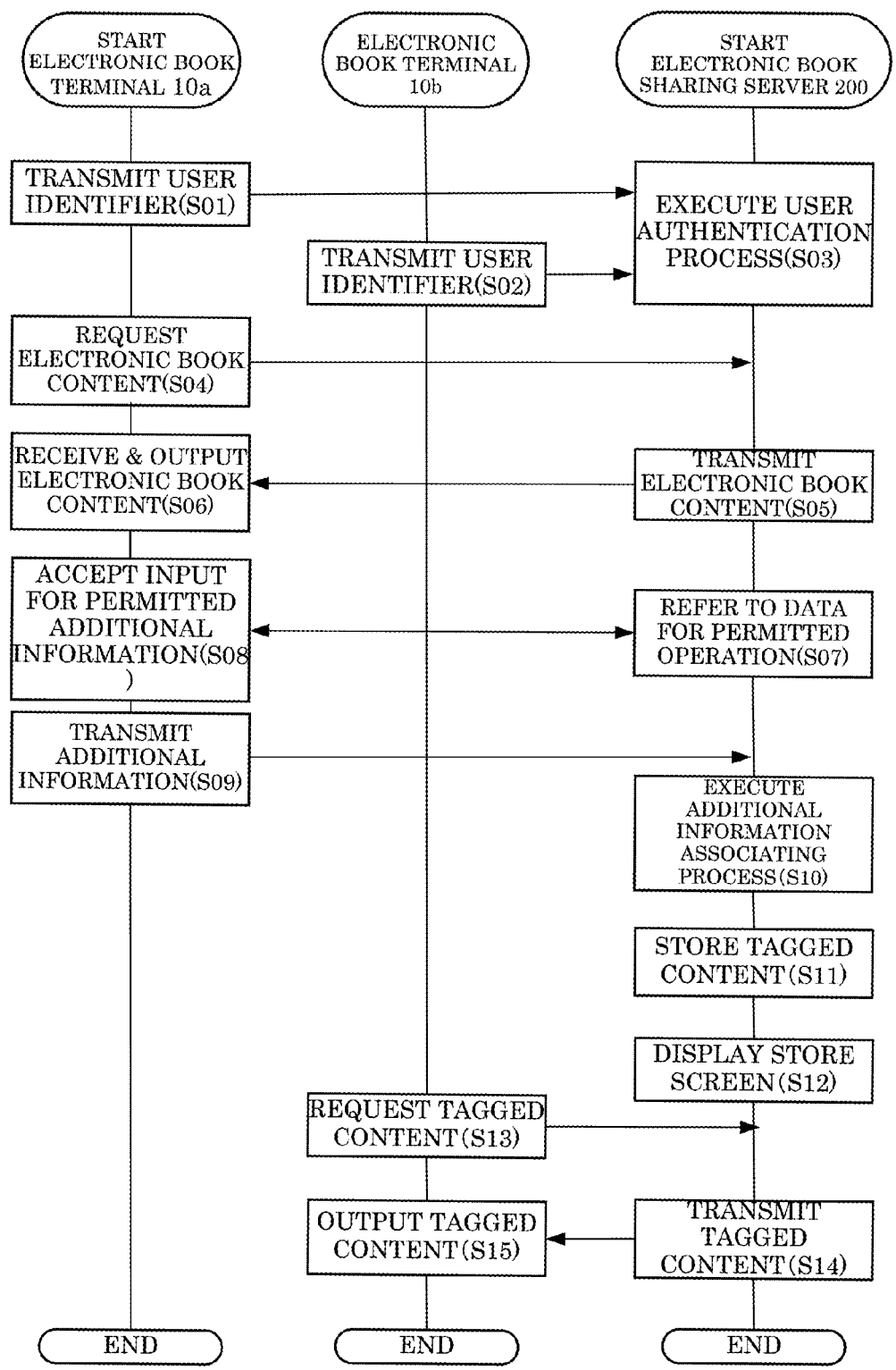

Fig. 4

<Permitted operation table>

| Electronic book content | Copyright holder | Permitted operation | | | | | |
|---|---|---|---|---|---|---|---|
| | | Comment | Copy | Link | Advertising link | Sales link | Dictionary link |
| XXX-XXX1 | ID550 | ◯ | × | × | × | × | × |
| XXX-XXX2 | ID551 | ◯ | ◯ | ◯ | × | × | ◯ |
| XXX-XXX3 | ID552 | ◯ | ◯ | ◯ | ◯ | ◯ | ◯ |

Fig. 5

<Permitted operation table (per user group)>

| Copyright holder | Permitted User Group | Permitted operation | | | | | |
|---|---|---|---|---|---|---|---|
| | | Comment | Copy | Link | Advertising link | Sales link | Dictionary link |
| ID550 | Group A | ◯ | × | × | × | × | × |
| | Group B | ◯ | ◯ | ◯ | × | × | ◯ |
| | Group C | ◯ | ◯ | ◯ | ◯ | ◯ | ◯ |

Fig. 6

<Permitted operation table for secondary use>

| Electronic book content | Copyright holder | Permitted operation | |
|---|---|---|---|
| | | Secondary use | Allocation |
| XXX-XXX1 | ID550 | ◯ | 90 |
| XXX-XXX2 | ID551 | ◯ | 80 |
| XXX-XXX3 | ID552 | ◯ | 40 |

E-BOOK SHARE SERVER, THE METHOD AND THE PROGRAM

TECHNICAL FIELD

The present invention relates to an electronic book sharing server that controls electronic book service, a method of sharing electronic book, and a program for the electronic book sharing server.

BACKGROUND ART

Recently, portable terminals called smartphone and tablet have been widespread. These portable terminals allow users to view electronic books including general books, textbooks, cartoons, magazines by installing a predetermined application.

A technology that allows a user to input a predetermined contribution information related to a predetermined page of the electronic book and share the contribution information and the predetermined page of the electronic book content is disclosed (for example, Patent Document 1).

CITATION LIST

Patent Literature

Patent Document 1: JP 2013-143028A

SUMMARY OF INVENTION

However, the disclosed method in Patent Document 1, a problem occurs for the secondary use of the a electronic book content including the contribution information because the copyright of the original electronic book content related to the contribution information is out of the consideration.

For example, when a user makes use of the original content of an electronic book to input a contribution information related to an electronic book, copy an electronic book, add an link information to a predetermined sentence of an electronic book for advertising, and add an image link for selling another content, strictly speaking, the user have to ask the copyright holder for the permission of the secondary use of the original content of the electronic book.

In this context, the objective of the present invention is to provide an electronic book sharing server, a method of sharing electronic book, and a program for electronic book sharing server to allow a user for the secondary use of the electronic book according to the use act previously permitted by the copyright holder of the electronic book.

According to the first aspect of the present invention, an electronic book sharing server communicatively connected with an electronic book terminal includes:

an electronic book content storing unit storing a predetermined electronic book content, a permitted operation determination unit determining the permitted operation of a user identifier to the additional information based on the permitted operation data previously determined for the user identifier upon receiving the additional information added to the electronic book content from the electronic book terminal, and tagged content storing unit storing a tag information associating the additional information with a page number of the electronic book content, the additional information being added to the page number to allow a user to view the electronic content from the electronic book terminal.

According to the first aspect of the present invention, an electronic book sharing server communicatively connected with an electronic book terminal stores a predetermined electronic book content, determines the permitted operation of a user identifier to the additional information based on the permitted operation data previously determined for the user identifier upon receiving the additional information added to the electronic book content from the electronic book terminal, and stores a tag information associating the additional information with a page number of the electronic book content, the additional information being added to the page number to allow a user to view the electronic content from the electronic book terminal.

The first aspect of the present invention is related to the category of a server, but another category e.g. a method category has similar functions and the effects according to its category.

According to the second aspect of the present invention, in the electronic book sharing server according to the first aspect of the invention, the user identifier added to the additional information is output from the electronic book terminal, and the tagged content is stored to enable the electronic book terminal to receive the tagged content.

According to the third aspect of the present invention, in the electronic book sharing server according to the second aspect of the invention, the evaluation of the tagged content is output from the electronic book terminal and the tagged content is stored to enable the electronic book terminal to receive the evaluation of the tagged content.

According to the fourth aspect of the present invention, in the electronic book sharing server according to the first aspect of the invention, the electronic book terminal receives link data from a predetermined electronic book terminal as additional information, and the permitted operation determination unit of the electronic book sharing server determines to allow the permitted operation to associate link access to the link data with the electronic book content to output the link access at a predetermined position.

The present invention can provide an electronic book sharing server allowing a user for the secondary use of the electronic book according to the use act previously permitted by the copyright holder of the electronic book.

BRIEF DESCRIPTION OF DRAWINGS

FIG. 3 shows the flow chart of an electronic book sharing process executed by an electronic book terminal 10 and an electronic book sharing server 200.

FIG. 4 shows an example table displaying the permitted operations for additional information.

FIG. 5 shows an example table displaying the permitted operations for additional information (per user group).

FIG. 6 shows an example table displaying the permitted operations for the secondary use.

DESCRIPTION OF EMBODIMENTS

Hereinafter, embodiments of the present invention will be described with reference to the attached drawings. However, this is illustrative only, and the technological scope of the present invention is not limited thereto.

Configuration of Electronic Book Sharing System 1

Figure 1:
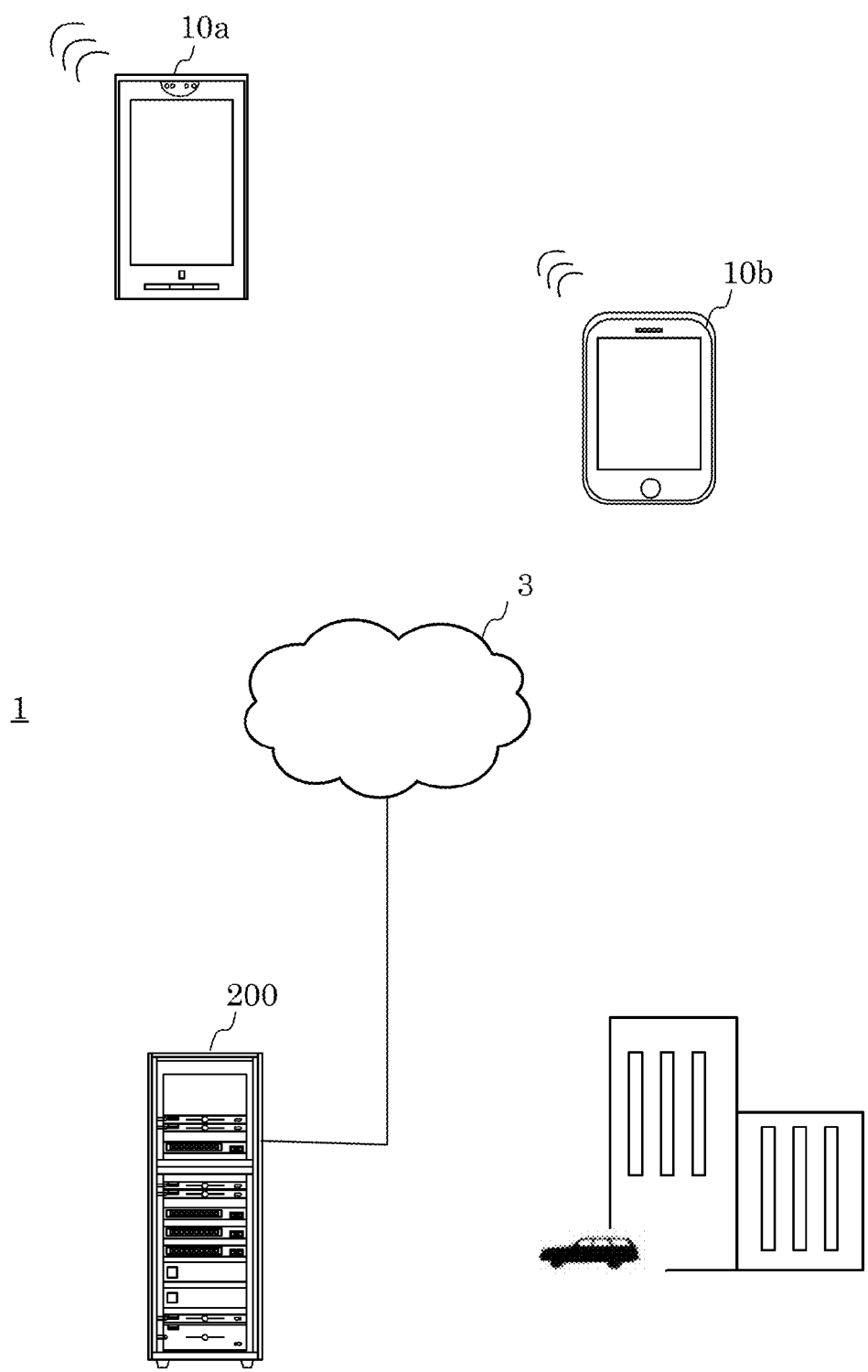
FIG. 1 shows the overall schematic diagram of an electronic book sharing system 1.

FIG. 1 is a configuration diagram of the electronic book sharing system 1 according to a preferred embodiment of the present invention. The electronic book sharing system 1 includes an electronic book terminals 10a and 10b (hereinafter simply referred to as "an electronic book terminal 10"), an electronic book sharing server 200, and a public line network 3 (the Internet, the third and the fourth generation communication networks, and the like).

The electronic book terminal 10 has the functions to be mentioned below, can perform data communication, and is an electrical appliance for domestic or business use. The electronic book terminal 10 may be an information appliance such as a smartphone, a tablet, a net book terminal, a slate terminal, an electronic book terminal and a potable music player in addition to a mobile terminal, a cellular phone, and a portable terminal. The electronic book terminal 10 also may be a general electrical appliance that can show digital contents such as a refrigerator, an audio device, a speaker, a washing machine, a router, a television, a printer, a multifunction printer, a heater, an air conditioner, a telephone, and a recording medium and a reproducing device in addition to a computer. The electronic book terminal 10 has a function to enable Internet communication using a protocol such as TCP/IP.

The electronic book sharing server 200 transmits digital contents to a digital content terminal 10 and allows a user to view the contents. This server has the functions mentioned-below. The server manages the service provided for the user of the electronic book terminal 10. The functions executed by the electronic book sharing server 200 may be separately performed on a plurality of physically divided server.

Functions

Figure 2:
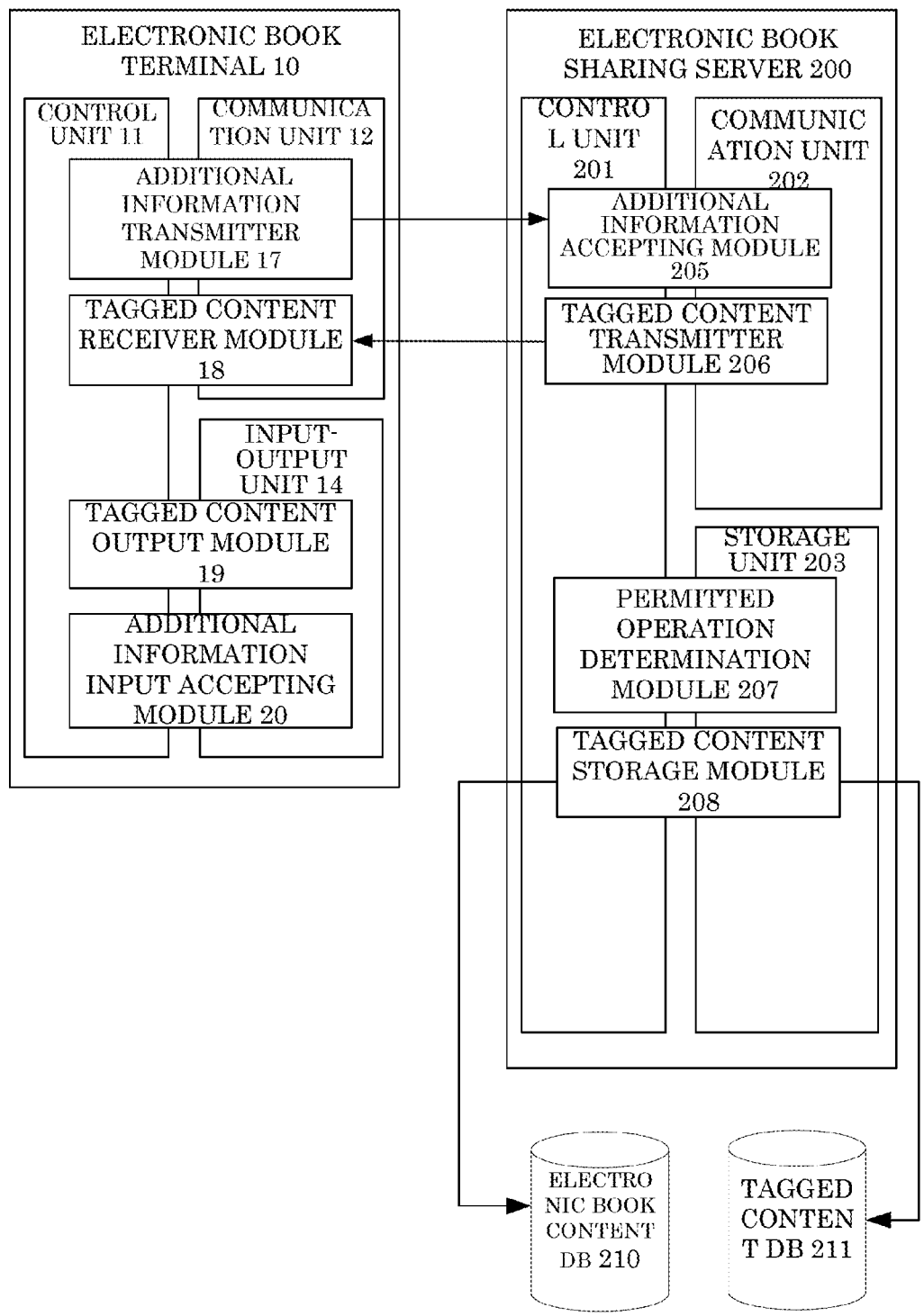
FIG. 2 shows the functional block diagram of an electronic book terminal 10 and an electronic book sharing server 200.

The configuration of each device will be explained with reference to FIG. 2.

The electronic book terminal 10 displays an electronic book content and includes a control unit 11 provided with a central processing unit (hereinafter referred to as "CPU"), random access memory (hereinafter referred to as "RAM"), and read only memory (hereinafter referred to as "ROM"). The electronic book terminal 10 also includes a communication unit 12 provided with a device communicating with other devices, for example a device connecting to a mobile communication network to perform communication or a Wireless Fidelity or Wi-Fi® enabled device complying with IEEE 802.11.

The electronic book terminal 10 also includes a display unit as an input-output unit 14 to output data and images controlled by the control unit. The input-output unit 14 displays the digital contents and the data received from the electronic book sharing server 200 and accepts the input like additional information from a user.

In the electronic book terminal 10, the control unit 11 reads a predetermined program and cooperates with the communication unit 12 to run an additional information transmitter module 17 and a tagged content receiver module 18. Moreover, the control unit 11 reads a predetermined program and cooperates with the input-output unit 14 to run a tagged content output module 19 and an additional information input accepting module 20.

The program read in the electronic book terminal 10 may be an application program installed in the electronic book terminal 10. The application program, at installation, may have a function to register the user identifier of a user operating the electronic book terminal 10. The electronic book terminal 10 appropriately accepts an input from a user such as an email address, a short message address, a telephone number, a product ID, and an ID associated with the application, etc. that are used to receive the electronic book content and the data from the electronic book sharing server 200. Then the electronic book terminal 10 transmits the received input to the electronic book sharing server 200 for registration.

The electronic book sharing server 200, in the same way as the electronic book terminal 10, includes a control unit 201 provided with a CPU, a RAM, and a ROM, and the like; and a communication unit 202 provided with a device that performs data communication with other computers, such as Wi-Fi® enabled device complying with, for example, IEEE802.11, and a device connectable with cables. The electronic book sharing server 200 also includes a data storage unit such as a hard disk, semiconductor memory, a recording medium, or a memory card as a storage unit 203 storing data, files and database tables.

In the electronic book sharing server 200, the control unit 201 reads a predetermined program and cooperates with the communication unit 202 to run an additional information accepting module 205 and a tagged content transmitter module 206. Moreover, the control unit 201 reads a predetermined program and cooperates with the storage unit 203 to run a permitted operation determination module 207 and a tagged content storage module 208.

An electronic book content DB 210 and a tagged content DB 211 may be external database servers. Original electronic book contents are stored in the electronic book content DB 210. Both of additional information added to original electronic book content and tag information associated with the additional information are associated and stored in the tagged content DB 211.

Here, the additional information is an additionally added information input by a user from a predetermined electronic book terminal 10, which is related to the electronic book content. The additional information may be limited by for example, a memo writing, a link information, a sales information, an explanation information, a word of mouth information etc. The tagged content is a content including an original electronic book content and an additional information added to the original content. In addition, tagging is to generate a correspondence data to add the additional information to a predetermined page number of the displayed electronic book content.

Electronic Book Sharing Process

FIG. 3 is a flow chart of the electronic book sharing process executed by the electronic book terminals 10(a,b) and the electronic book sharing server 200. The process executed by the module of each of the above-mentioned devices will be explained together with the present process. Here, although the explanation is made using 2 electronic book terminals 10, one is for transmitting and the other is for viewing additional information, it is assumed that a plurality of the electronic book terminals 10 access the electronic book sharing server 200.

First, the electronic book terminal 10 transmits the user identifier to the electronic book sharing server 200 (Steps S01 and S02). For example, by executing an application installed in the electronic book terminal 10, previously registered user identifier may be transmitted to the electronic book sharing server 200, or the user identifier may be transmitted in response to the user input, etc. to the electronic book sharing server 200 when a user requests the output of a predetermined WEB page.

The electronic book sharing server 200 receives the transmitted user identifier and executes a user authentication process (Step S03). Then, although it is not shown in the figures, the electronic book sharing server 200 transits to a state of being ready for the download of the electronic book content and waits for a request from the electronic book terminal 10.

The electronic book terminal 10a requests an electronic book content from the electronic book sharing server 200 in response to a user operation (Step S04). In response to this request, the electronic book sharing server 200 retrieves the requested electronic book content from the electronic book content DB 210, and transmits the retrieved content to the electronic book terminal 10a (Step S05). Then, the electronic book terminal 10a receives the electronic book content from the electronic book sharing server 200 and the input-output unit 14 displays the received content (Step S06).

Next, when the user input of additional information is accepted from the electronic book terminal 10, the permitted operation of a user identifier is determined based on the permitted operation data. The permitted operation data is a data that specified a limitation concerning permitted operation when adding an additional information to the electronic book content. For example, it may be the permitted operation tables shown in FIGS. 4 and 5. The permitted operation data is a data previously specified by the copyright holder of the electronic book content and stored in the electronic book sharing server 200.

For example, with referring to FIG. 4, for the electronic book content (XXX-XXX1) of the copyright holder ID550, only the comment writing is permitted, from among comment writing, copy of sentence, link, link of advertising information, link of sales information, and link of dictionary information, by the copyright holder to additional information.

Comment writing is to make a memo writing (tweet or comment) which is appended like a tag in the page where the electronic book content is displayed. Copy of sentence is to copy a sentence and an image etc. of the electronic book content. Link is to insert a link in a memo writing. The link operation are link of advertising information, link of sales information, and link of dictionary information depending on a linked content. The permission is grouped by a linked content because a link of dictionary information etc. is never be an issue for copyright holder of electronic book content, but links of the advertising information and the sales information may be limited in some cases.

On the other hand, for the electronic book content (XXX-XXX2) of the copyright holder ID551, comment writing, copy of sentence and link (only to a dictionary information) is a permitted operation to the additional information.

In step S07, the permitted operation determination module 207 refers to the permitted operation data and transmits an interface for accepting an input of the additional information, which is permitted to the electronic book content, to the electronic book terminal 10. The additional information input accepting module 20 of the electronic book terminal 10 accepts an input of permitted additional information from a user (Step S08).

In the above-mentioned example, in case of the electronic book content (XXX-XXX1), only an input of comment writing is accepted because only the comment writing is permitted as the additional information from the electronic book terminal 10. In case of the electronic book content (XXX-XXX2), input of comment writing, copy of sentence or link (only link of dictionary information) is accepted as additional information from the electronic book terminal 10.

For the permitted operation, as shown in FIG. 5, different operations for each group may be permitted for a certain electronic book content. Here, the group is an aggregation of the set of the plurality of user identifiers. For example, group A is a set of user identifiers which has never bought any electronic book from a copyright holder. Group B is a set of user identifiers which has bought one electronic book from the copyright holder. Group C is a set of user identifiers which has bought two or more electronic books from the copyright holder. In this case, for group C, an operation such as comment writing, copy and link (all types of link operation) is permitted based on the determination of the copyright holder (ID550). On the other hand, for groups A and B, the operation such as advertising link and the sales link is not permitted.

Next, the additional information transmitting module 17 of the electronic book terminal 10 transmits the input additional information to the electronic book sharing server 200 (Step S09). The tagged content storage module 208 of the electronic book sharing server 200 associates the additional information with the page number of the electronic book content where the additional information is added (Step S10), and stores them in the tagged content DB 211 as a tagged content (Step S11). The tagged content may contains the electronic book DB or may be separated with the electronic book DB. Here, the tagged content is stored to allow a user to view the electronic content from the electronic book terminal 10.

Figure 7:
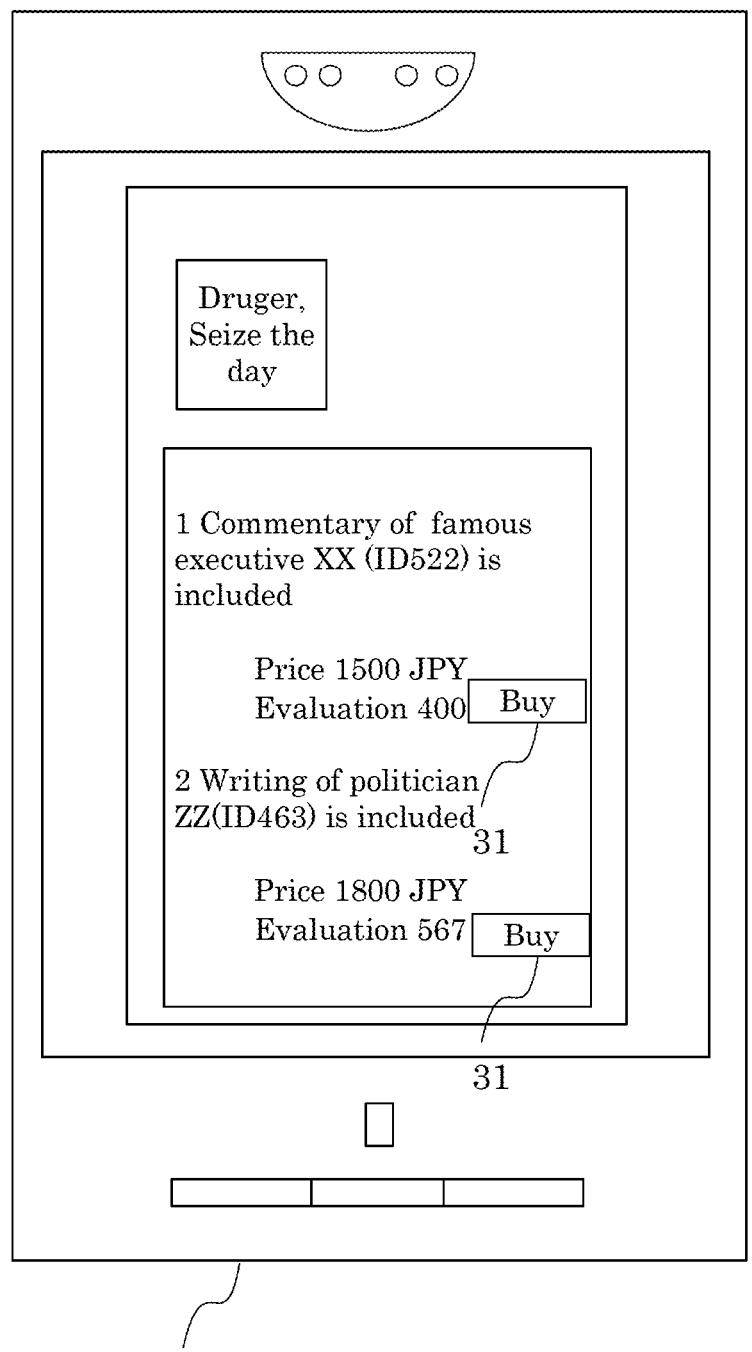
FIG. 7 shows an example image of the screen output of a store displayed in the electronic book terminal 10.

The electronic book sharing server 200 displays a WEB page which is a store display for selling a tagged content such as shown in FIG. 7 (Step S12). The store display is a WEB page selling electronic book contents and applications in response to a download request of the electronic book content and the application from a user. For example, the electronic book sharing server 200 transmits a requested tagged content to the electronic book terminal 10 in response to a request from a user of the electronic book terminal 10.

In the example of FIG. 7, for the electronic book content "Druger, Seize the day", the tagged content with additional information is displayed for each tagged user identifier (the user identifier ID522 corresponding to a famous executive XX and the user identifier ID463 corresponding to a politician ZZ) including an evaluation of tagged content in a predetermined electronic book terminal 10 to allow a user for further downloading of the content. At this point, through an operation of the buy button 31 by an user who is viewing the content, the tagged content (including the electronic book content) is downloaded in the operated electronic book terminal 10.

Figure 8:
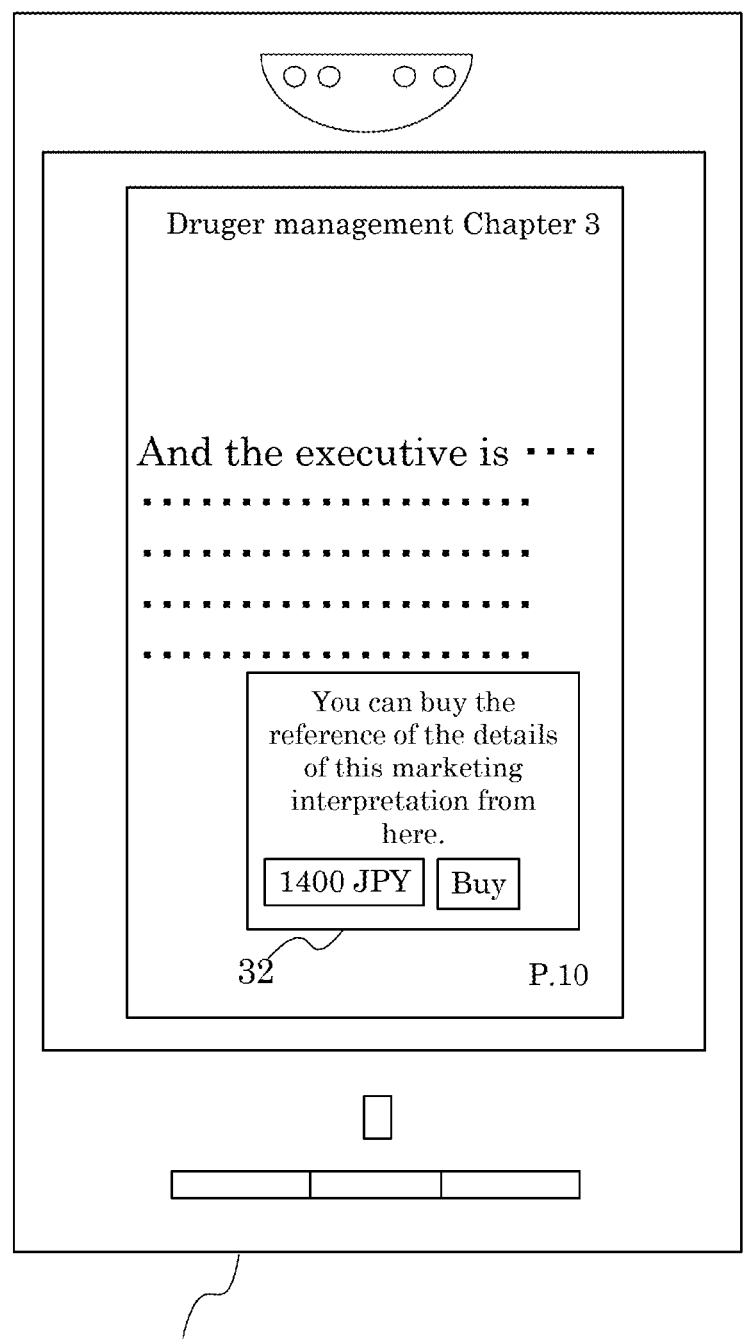
FIG. 8 shows an example image of the screen output of the electronic book content and the sales link displayed in the electronic book terminal 10.

Next, the electronic book terminal 10b requests a certain tagged content which is store displayed (Step S13). In response to the request, the tagged content transmitter module 206 of the electronic book sharing server 200 transmits the requested tagged content (Step S14). The transmitted tagged content is received by the tagged content receiver module 18 of the electronic book terminal 10 and output by the tagged content output module 19. For example, as shown in FIG. 8, sales link 32 (at the page and the position where the additional information was added by the user) is output as additional information with the electronic book content. In response to user's pressing on a buy button at sales link 32, the electronic book terminal 10b executes link access to the predetermined purchase page.

Figure 9:
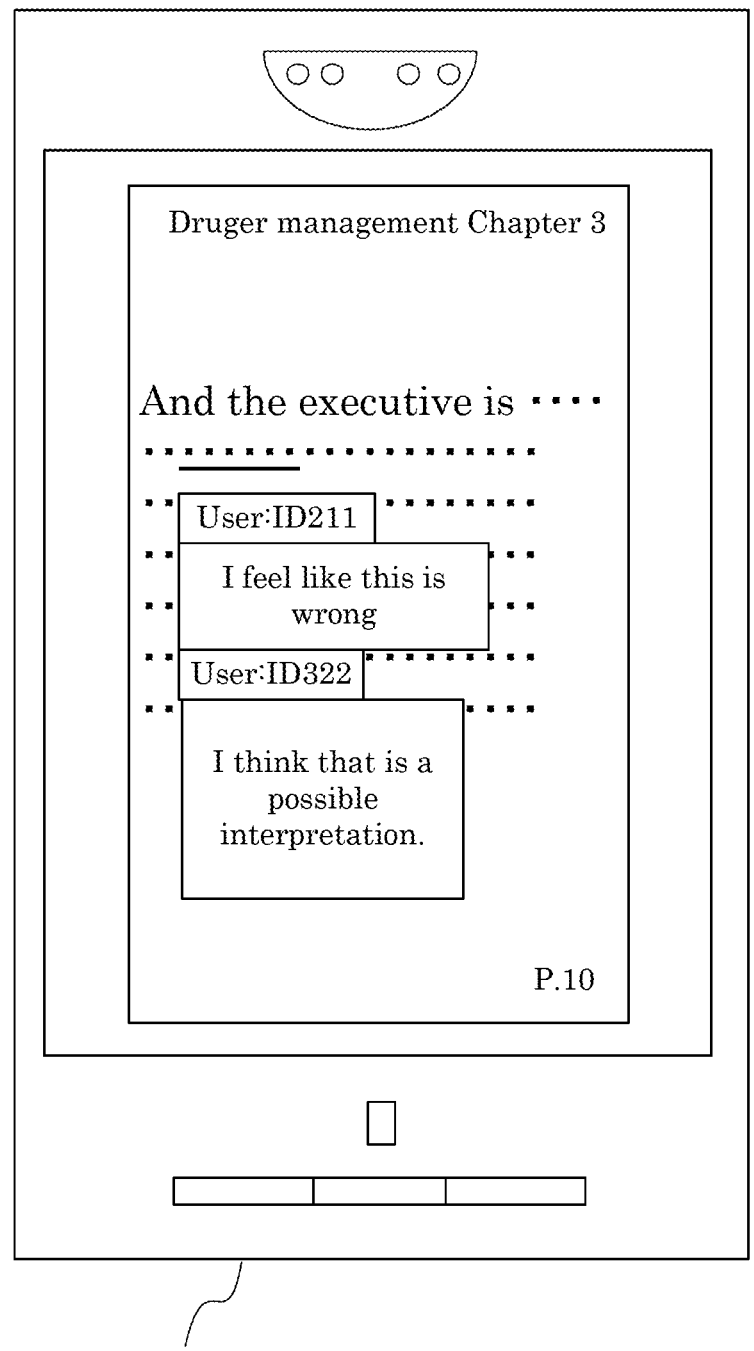
FIG. 9 shows an example image of the screen output of the electronic book content and the additional information input from the plurality of electronic book terminals 10 displayed in the electronic book terminal 10.

In the above-mentioned example, the additional information input from electronic book terminal 10a can be viewed from the electronic book terminal 10b. But as shown in FIG. 9, the additional information (ID211, ID322) input from a plurality of the electronic book terminals 10 may be added respectively to generate a tagged content which allow user to view from a predetermined electronic book terminal 10. In this case, the tagged content shared by a plurality of users (user identifiers) is stored to allow a user for further downloading of the content. When additional information is displayed in the electronic book terminal 10b, a user identifier related to the input of the additional information is displayed.

In case of selling a tagged content, the copyright holder of the electronic book content also has the secondary use rights. When the permitted operation is confirmed, if the tagged content is sold to a user who had added the additional information, the allocation of the sales price is determined based on the permitted operation table of the secondary use such as FIG. 6. For example, when the tagged content includes the electronic book content (XXX-XXX1) of ID550 with the additional information is sold, 90% of the sales price is allocated to ID550 and 10% of the sales price is allocated to the user who added the additional information. In this process, when a predetermined user buys a tagged content from the store displayed (Step S12), the billing is charged after allocating the sales price based on the user identifier.

To achieve the means and the function that are described above, a computer (including CPU, an information processor, and various terminals) reads and executes a predetermined program. For example, the program is provided in the form recorded in a computer-readable medium such as a flexible disk, CD (CD-ROM, etc.), and DVD (DVD-ROM, DVD-RAM, etc.). In this case, a computer reads a program from the recording medium, forwards and stores the program to and in an internal or an external storage, and executes it. The program may be previously recorded in, for example, a storage (recording medium) such as a magnetic disk, an optical disk, and a magneto-optical disk and provided from the storage to a computer through a communication line.

The embodiment of the present invention is described above. However, the present invention is not limited to the above-mentioned embodiment. The effect described in the embodiment of the present invention is only the most preferable effect produced from the present invention. The effect of the present invention is not limited to those described in the embodiment of the present invention.

REFERENCE SIGNS LIST

1 electronic book sharing system
10a, 10b electronic book terminal
200 electronic book sharing server

The invention claimed is:

1. An electronic book sharing system comprising:
an electronic book terminal communicatively connected with an electronic book server, wherein,
the server includes:
an electronic book content storage unit storing predetermined electronic book content;
a tagged content storage unit storing tag information that includes additional information associated with a page number of the predetermined electronic book content; and,
a permitted operation determination unit determining whether an electronic book terminal is authorized to access tag and additional information associated with a particular subscription level on the basis of preexisting permitted operation data, and wherein,
upon determining that an electronic book terminal is authorized to access the particular subscription level, the server transmits the tag and additional information associated with the authorized subscription level to the electronic book terminal.

2. The electronic book sharing system according to claim 1, wherein the operation determination unit also determines whether an electronic book terminal is authorized to add tag and additional information to the tagged content storage unit on the basis of the authorized subscription level and the preexisting permitted operation data.

3. The electronic book sharing system according to claim 2, wherein the tag and additional information that may be added includes at least one of a comment associated with a page number of the predetermined electronic book content, an identity of a user authorized to add the tag and additional information to the tagged content storage unit, link access associated with link data, sales data, and dictionary data.

4. The electronic book sharing system according to claim 3, wherein the subscription level and the preexisting permitted operation data is determined by a copyright holder of the predetermined electronic book content.

5. The electronic book sharing system according to claim 4, wherein the preexisting permitted operation data and subscription level information is stored in the electronic book sharing server.

6. The electronic book sharing system according to claim 4, wherein, the server additionally stores predetermined content allocation information corresponding to an author of the predetermined electronic book content, as well as an author of any tagged and additional information associated with, and added to, the predetermined electronic book content.

7. The electronic book sharing system according to claim 6, wherein, if any proceeds are derived from the sale of the predetermined electronic book content and any tagged and additional information associated therewith, such proceeds are allocated according to the predetermined allocation information.

8. A method of sharing an electronic book comprising:
communicatively connecting an electronic book terminal with an electronic book server including an electronic book content storage unit storing predetermined electronic book content;
storing tag information that includes additional information associated with a page number of the predetermined electronic book content in a tagged content storage unit; and,
determining whether the electronic book terminal is authorized to access tag and additional information associated with a particular subscription level on the basis of preexisting permitted operation data via a permitted operation determination unit, and
upon determining that an electronic book terminal is authorized to access the particular subscription level, transmitting the tag and additional information associated with the authorized subscription level from the server to the electronic book terminal.

9. A computer program implementable on an electronic book sharing server communicatively connected with an electronic book terminal, the computer program comprising a non-transitory computer readable medium having a set of instructions physically embodied therein, the set of instructions including computer readable program code, which when executed by the server causes an information processing unit thereof to:

store predetermined electronic book content in a first database;

store tagged and additional information associated with a page number of the predetermined electronic book content in a second database;

determine whether the electronic book terminal is authorized to the access tagged and additional information, which is associated with a particular subscription level, on the basis of preexisting permitted operation data, and transmit the tag and additional information associated with the authorized subscription level to the electronic book terminal when it is determined that an electronic book terminal is authorized to access the particular subscription level.

\* \* \* \* \*